Figure 1:
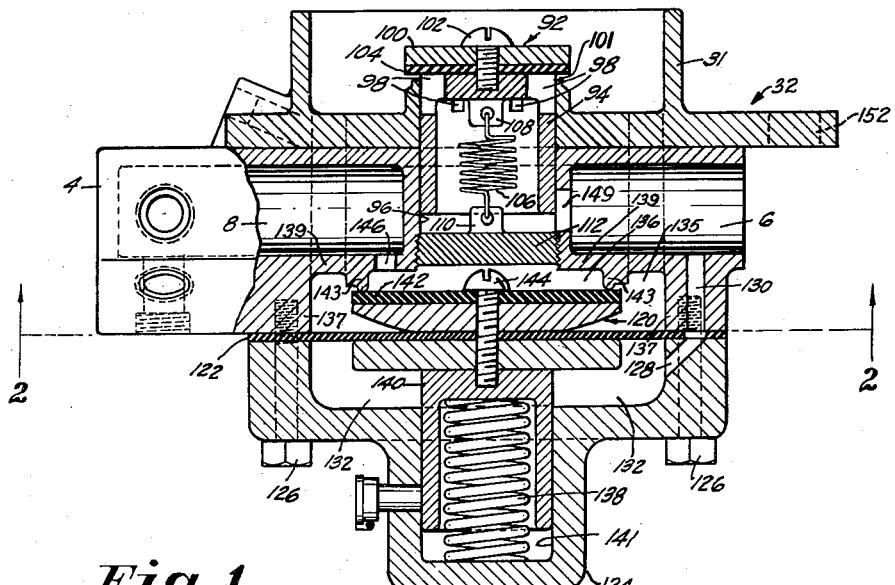

July 10, 1962 K. K. KUGLER 3,043,333
VALVE ASSEMBLY
Filed May 7, 1956

INVENTOR.
KEITH K. KUGLER.
BY

1

3,043,333
VALVE ASSEMBLY
Keith K. Kugler, Beatrice, Nebr.
(Culbertson, Nebr.)
Filed May 7, 1956, Ser. No. 583,081
2 Claims. (Cl. 137—506)

This invention relates to valve assemblies and more particularly it is an object of my invention to provide a valve for a metering pump which overcomes vaporlocking problems.

The most common problem in the pumping of volatile liquids is vapor locking. Heat from the sun can cause boiling of a volatile regardless of whether the contents of the tank are 10% vapor and 90% liquid or vice versa. At times when it is desired for a pump to be pumping such a liquid the pressure of the vapor in the tank forces the liquid against the inlet side of the pump. The most volatile of these liquids used in fertilizing is anhydrous ammonia and with a pump that is equipped with my invention it is possible to meter anhydrous ammonia accurately.

Another object is to provide a valve assembly for a metering pump for applying liquid fertilizer of both high or low pressure type due to pressure equalizing means built into the pump.

A further object is to provide a valve assembly for a metering pump that is capable of distributing more than one fertilizer of variable pressures in one operation being applied to the field through a triple chamber pump.

A particular object of this invention is to provide a valve assembly for use with a metering pump that is adapted to meter liquids which give off vapors at temperatures between 1° and 110° Fahrenheit.

Yet another object is to provide a valve assembly for a metering pump of a single chamber type and one which is easily adapted to receive additional pumping chambers.

Still a further object is to provide a valve assembly for a multiple metering pump having the advantages of an accurately controlled rate of dispersement because of ground driven power means and pump chamber capacity adjustment, there being no deviation of application as it is controlled by ground speed.

Still another object is to provide a valve assembly for a metering pump having an inexpensive flexible pump chamber, easily replaced which eliminates the necessity for expensive metal cylinders and pistons.

A further object of my invention is to provide a valve assembly for a metering pump using ground wheel power and having a clutch means for disengaging the pump at desired times for preventing waste of fertilizer and uneven distribution.

The pump of this invention discharges through an outlet manifold 4 which has a passageway 8 therein, as later described, and receives fluid through an intake port 6 which can be attached to a suction line.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

Figure 2:
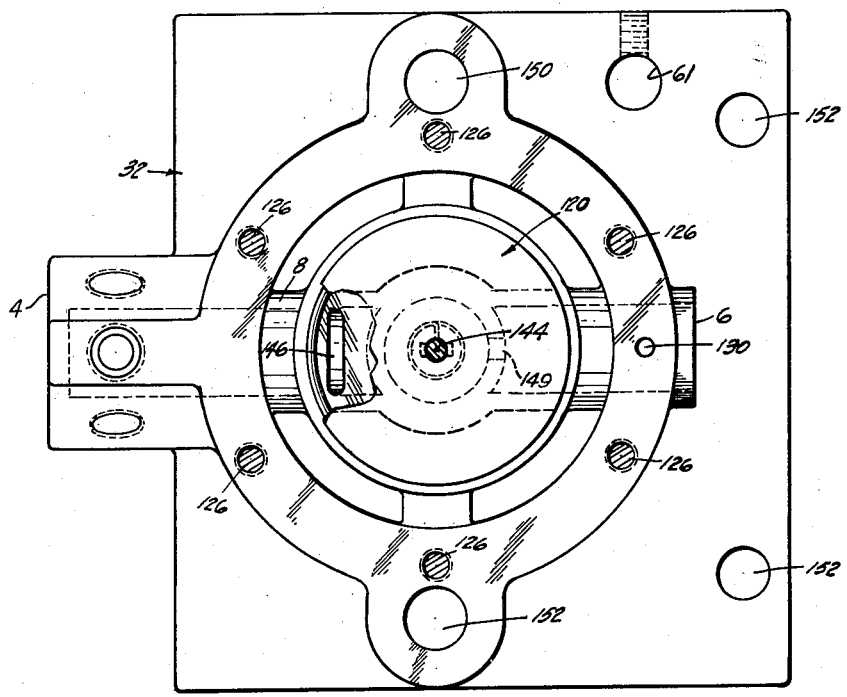

In the drawings:

FIG. 1 is a detailed sectional view, partly broken away, of a valve assembly as it is installed in the valve end of a metering pump for which it has been designed; and FIG. 2 is a transverse sectional view, partly broken away, of the valve assembly of FIG. 1, taken approximately on the line 2—2 of FIG. 1.

Referring more in detail to the drawing, wherein like parts are designated by like reference numerals, the reference numeral 32 is used to designate a cylinder head for a metering pump with which the valve assembly embodying the present invention was designed to be used. For the purpose of illustrating the invention, it is to be noted that an extensible cylinder for the pump, not shown, is to be connected to a ring 31 that is integral with the cylinder head 32. The cylinder head 32 is provided with a discharge or outlet manifold 4 which has a passageway 8 therein and receives fluid through an intake port 6 which can be attached to a suction line, not shown. It is also pointed out that the valve assembly embodying the invention is particularly adapted for use with liquids which give off vapors at temperatures between 1° and 110° Fahrenheit. The inlet intake or suction valve 92 is comprised of a cylindrical body section 94 of a size to slide freely in a cylindrical valve opening or first valve chamber 96 in the cylinder head 32.

One end of the valve body section 94 is closed but is provided with inlet port means, inlet ports or openings 98 for the passage of liquid from the supply tank to the cylinder of the pump, not shown, on the suction stroke of the pump. Also correlated with the valve 92 is a flat metal disc 100 with a diameter greater than the body section 94 to form a shoulder or seat on the valve 92. It is secured to the valve body 94 by a screw 102 with a disc of rubber 104 or other suitable material of the same diameter as the metal disc 100 interposed between the disc 100 and valve body 94.

The rubber disc 104 being a seal and cushion between the valve 92 and inlet valve seat 101 on the cylinder head 32 when the valve 92 is in a closed position.

The valve 92 is spring weighted by a coiled tension spring 106, one end of which is secured to a lug 108 integral with the closed end of the valve body 94 and on the interior surface thereof. The other end of the spring 106 is secured to the lug 110 integral with the plug 112.

The outlet or discharge valve 120 is controlled by a diaphragm 122 which is secured by cap screws 126 between valve housing or cylinder head 32 and the outlet valve cover 124. The orifice 128 in the valve cover 124 is in alignment with and contiguous to an opening 130 in the cylinder head 32 and the two together form a continuous opening as forms a means of free communication of the intake 6 or suction line of the pump with the posterior area or third chamber 132 of the diaphragm 122.

It will be seen that the orifice 128, the opening 130, the intake port 6, and an opening 149 between the intake port 6 and the first chamber 96 all together form a passageway connecting the first chamber 96 and the third chamber 132 to admit fluid to the third chamber to counteract pressure against the diaphragm 122, said counteracting pressure coming from the fluid in the first chamber 96.

The outlet valve 120 is comprised of a valve guide 140 of cylindrical section of which one end is closed. The valve guide 140 is of a size to move slidably in the cylindrical opening 141 in the valve cover 124.

The outlet valve 120, with a disc of rubber 142 or other suitable material thereon to serve as a cushion and seal for the outlet valve 120, is secured to the outlet valve guide 140 by a screw 144. The diaphragm 122 is interposed between the outlet valve 120 and the outlet valve guide 140. The outlet valve 120 has its rubber disc 142 seating against an annular valve seat 143 which opens from the sides of the second chamber 136.

With the liquid being supplied to the pump at atmospheric pressure there is equal pressure on either side of the diaphragm 122. The outlet valve is held in a closed position by the coiled compression spring 138 within the outlet valve guide 140.

The cylindrical valve opening 96 is deeper than needed to receive the body section 94 of the suction valve 92 and the opening 96 opens upon an enclosed area or second chamber indicated by the numeral 136, which is defined by the side wall 137 of the casting on each side and defined by a wall 139 which surrounds the outer side of a cylindrical wall 141, through which the cylindrical valve opening 96 extends, whereby the wall 139 connects the cylindrical 131 with the outer wall 137 on all sides of the cylindrical wall 141 for defining the open space 135. The wall 139 has an annular protruding portion 143 surrounding and spaced from the cylindrical wall 141 and protruding outwardly into the open space 135 for defining a valve seat against which the valve disc 142 seats to close off the second chamber or anterior area 136 of the diaphragm 122 to close off the area 135 from an area 136 disposed within the annular protrusion 143. When the valve disc 142 is seated, the area 136 is closed off from the area 135 whereby no flow through the outlet portion 146 in the wall 139 can occur. The open space 135 is further enclosed on the other side by the diaphragm 122. The plug 112 is preferably threaded on its outer side and is threadedly received on a threaded portion of the cylindrical valve opening 96 which is disposed at the opposite end of the cylindrical wall 141 from the rubber disc 104. In this way the plug 112 is adjustably anchored.

The pressure is thereby increased on the anterior area 135 of the diaphragm 122, and the diaphragm 122 is urged outward against the weight or power of the coiled spring 138. The outlet valve 120 is opened allowing the liquid to flow through the outlet port 146 to the passageway 8 and to the outlet manifold 4 on the discharge stroke of the crank of the pump, not shown.

With the liquid being supplied to the pump under pressure there is a greater total pressure exerted on the posterior area or third chamber 132 of the diaphragm 122 than on the anterior area 135 of the diaphragm 122, since the outlet side of the outlet valve 120 is subjected to atmospheric pressure only when in closed position.

Liquid cannot pass through the outlet valve 120 when the liquid to be pumped is supplied under pressure as it would in a pump with conventional valves. Only when the cylinder of the pump, not shown, is compressed and the pressure on the outlet valve 120 side of the diaphragm 122 is increased thereby to the point where the outlet valve 120 opens is the liquid forced into the outlet manifold 4. As soon as the stroke is completed the outlet valve is closed and the cycle is repeated.

It will be seen that the opening 149 passes through the cylinder head 32 from that side thereof at which the pump, not shown, is attached and specifically from openings in the cylinder head 32 surrounded by the ring 31 which forms a part of the valve end which protrudes outwardly on the pump side thereof for facilitating the attachment of the pump, not shown, to the cylinder head 32.

The opening 149 extends through the cylinder head 32 to the second chamber 136 and is adapted to receive liquid therethrough flowing from the pump, not shown, to the second chamber 136. As thus described, those ends of opening 149 which are at the exterior of the cylinder head 32, adjacent to the ring 31, are inlet ports for fluid.

Only metered liquid may pass through the pumps, whether the liquid is being supplied to the pump under pressure or at atmospheric pressure. No adjustments to the pump are needed to use either.

In FIG. 2, openings 150 in the cylinder head 32 are for receiving one end of the stabilizing and cross head guide rods of the pump, not shown. Cap screws 36 pass through the openings 152 to secure cylinder head 32 to the bed plate of the pump, not shown.

In operation, the intake valve 100 opens when the force exerted on its head by the pressure within the interior of the pump is lower than the pressure exerted on the intake valve head 100 in an opening direction by the intake fluid less the force of the spring 106.

The outlet diaphragm valve is opened when the force of the pressure within the second chamber increases sufficient to overcome the force of the spring 138 plus whatever force the inlet fluid pressure is exerting against the diaphragm valve 120.

From the foregoing description, it is thought to be obvious that a valve assembly constructed in accordance with my invention is particularly well adapted for use, by reason of the convenience and facility with which it may be assembled and operated, and it will be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. A valve assembly for a metering pump particularly for metering liquid which gives off vapors at Fahrenheit temperatures between 1° and 110° Fahrenheit comprising a cylinder head having an inlet port means, means in said cylinder head providing a first chamber disposed in communication with said inlet port means, and an inlet valve seat surrounding said inlet port means, an inlet valve in said inlet port means, means urging said valve into a closed position against said inlet valve seat, said valve positioned to be opened by suction on its side opposite its inlet valve seat, said cylinder head having second and third chambers disposed alongside each other, a flexible resilient diaphragm disposed between and separating said second and third chambers, said second chamber being separated from said first chamber, a passageway through said cylinder head connecting said first chamber and said third chamber to admit fluid to said third chamber to counteract pressure against said diaphragm from fluid in said second chamber, an outlet valve in said second chamber and attached to said diaphragm and movable therewith, an annular outlet valve seat extending into said second chamber from said cylinder head and cooperative with said valve, means coacting with said outlet valve to bias said outlet valve into a seated position and opening when said diaphragm is pressed by a liquid that is forced in a direction away from said outlet valve seat, an outlet port means extending through said cylinder head from said second chamber to conduct fluid from said second chamber when said outlet valve is in an open position, said outlet port means opening upon said second chamber from within said valve seat whereby when said second valve is seated said outlet port means is closed, said cylinder head having an opening extending therethrough from the outside thereof to said second chamber when fluid is directed into the outer ends of said opening the liquid can flow through said opening into said second chamber.

2. The combination of claim 1 in which the means coacting with said outlet valve comprises a spring means that is positioned in said third chamber and presses against said diaphragm for urging said diaphragm toward said second chamber to hold said outlet valve into a closed position, said spring means being for use particularly when a liquid under a low pressure is being used in said valve.

(References on following page)

References Cited in the file of this patent

UNITED STATES PATENTS

| | | | |
|---|---|---|---|
| 632,461 | Hoffmann | Sept. | 5, 1899 |
| 1,436,443 | Holmes | Nov. 21, | 1922 |
| 1,742,183 | Bell | Jan. 7, | 1930 |
| 1,793,513 | Schneider | Feb. 24, | 1931 |
| 1,876,938 | Horne | Sept. 13, | 1932 |
| 2,047,540 | Allen et al. | July 14, | 1936 |
| 2,067,229 | Birch | Jan. 12, | 1937 |
| 2,089,706 | Orr | Aug. 10, | 1937 |
| 2,421,679 | Bingham | June 3, | 1947 |
| 2,680,477 | Schira | June 8, | 1954 |
| 2,703,102 | Neugebauer | Mar. 1, | 1955 |
| 2,723,624 | Franck | Nov. 15, | 1955 |
| 2,748,797 | Heizer et al. | June 5, | 1956 |

FOREIGN PATENTS

| | | | |
|---|---|---|---|
| 976,956 | France | Nov. 8, | 1950 |
| 285,562 | Switzerland | Jan. 5, | 1953 |